United States Patent [19]
Hiroki et al.

[11] Patent Number: 5,700,415
[45] Date of Patent: Dec. 23, 1997

[54] METHOD OF MOLDING SYNTHETIC RESIN AND APPARATUS FOR USE THEREIN

[75] Inventors: Toyohisa Hiroki, Chiba; Tadashi Suzuki, Saitama-ken, both of Japan

[73] Assignees: Toska Co., Ltd., Tokyo; Optec Co., Ltd., Saitama-ken, both of Japan

[21] Appl. No.: 541,724

[22] Filed: Oct. 10, 1995

[30] Foreign Application Priority Data

Oct. 19, 1994 [JP] Japan .................. 6-253281

[51] Int. Cl.⁶ ............................................ B29C 45/44
[52] U.S. Cl. .................. 264/318; 249/63; 249/152; 264/334; 425/577; 425/DIG. 5; 425/DIG. 58
[58] Field of Search .................. 264/318, 334; 249/63, 142, 152, 178, 180; 425/577, 438, 441, DIG. 5, DIG. 58

[56] References Cited

U.S. PATENT DOCUMENTS

| | | | |
|---|---|---|---|
| 4,502,660 | 3/1985 | Luther et al. | 425/DIG. 58 |
| 4,541,605 | 9/1985 | Kubota et al. | 425/DIG. 58 |
| 4,627,810 | 12/1986 | Von Holdt | 425/DIG. 58 |
| 4,676,732 | 6/1987 | Letica | 425/DIG. 58 |
| 4,832,307 | 5/1989 | Watanage et al. | 425/DIG. 58 |
| 4,881,891 | 11/1989 | Luther | 425/DIG. 58 |
| 4,938,679 | 7/1990 | Pietrorazio | 425/DIG. 58 |
| 5,403,179 | 4/1995 | Ramsey | 425/DIG. 58 |

*Primary Examiner*—Jill L. Heitbrink
*Attorney, Agent, or Firm*—Nikaido Marmelstein Murray & Oram LLP

[57] ABSTRACT

A molded article having a large undercut part is efficiently produced by a method of molding a synthetic resin with the use of an apparatus comprising an outer mold (S) and an inner mold (N) arranged so as to form a cavity (C) inside the outer mold (S), said inner mold (N) comprising a central mold segment having a part whose size is reduced toward its head and mold segments (6, 7) for forming an inner surface of a molded article which are supported so as to be able to meet and get apart from each other around the central mold segment (4) and divided into a plurality of separate segments, wherein said mold segments for forming the inner surface of the molded article are rendered movable toward the center of the apparatus by moving the central mold segment and wherein the inner mold (N) is withdrawn in the form of its size reduced as a whole from inside the molded article (21) supported in the outer mold (S).

5 Claims, 9 Drawing Sheets

METHOD OF MOLDING SYNTHETIC RESIN AND APPARATUS FOR USE THEREIN

BACKGROUND OF THE INVENTION

The present invention relates to a molding method for obtaining a molded article having what is known as an undercut part, which has irregularities formed on the outer or inner surface thereof, thereby disenabling withdrawal of the mold after the completion of the molding. Also, it relates to an apparatus for use in the above method.

For example, molded articles having irregularities on the outer and inner surfaces thereof such as a pot and potlike vessels and molded articles having screwlike irregularities on the inner surfaces thereof cannot be withdrawn from the conventional molds after the completion of the molding operation. Thus, a method is being employed in which such an article is divided into a plurality of parts and in which parts each is molded in a form enabling withdrawal from the mold are assembled.

A screw having a spiral formed on its surface such as a screw made of a synthetic resin is a representative example of the molded screws which cannot be withdrawn from the mold after the completion of the molding operation because of the occurrence of an undercut part, i.e., a part of the mold becoming a block to thereby disenable withdrawal of the molded screw from the mold despite the opening of the mold. In the case of a synthetic-resin-made screw having a multiplicity of undercut parts formed thereon, short ones each of one pitch are first molded and a stem is passed through the centers of the short screws to thereby convert the same to a long screw for a practical use.

However, the above screw assembled by longitudinally connecting the short screws each of one pitch is naturally likely to suffer from pitch errors to thereby render the accurate feed operation thereof difficult. Further, there is a problem such that an uneven fitting part is generally formed at an edge of the one-pitch screw prior to connection, so that providing the resultant screw with torque would cause breakage of the fitting part and, if not, pitch drift to thereby disenable powerful and accurate feed operation.

Even an article of special shape such as any of various detergent containers or a container of mayonnaise or ketchup can be produced by conducting blow molding with the use of a mold having the outer surface of the article formed therein and withdrawing the blow-molded article from the mold while deforming the article per se as long as the article has a small thickness and is formed from a soft resin. However, this is a technology which cannot be applied to a strong synthetic resin molding composed of a relatively hard resin such as the above synthetic-resin-made screw.

For molding a synthetic resin into a container requiring strength and a given thickness such as a pot or any of various vessels, it is requisite that not only the outer form but also the internal cavity of the container be designed in such simple forms as to enable ready withdrawal of the mold from the molded container. Nevertheless, it is very difficult to mold a synthetic resin into an article of complex shape such as a pot produced from a ceramic ware such as a china in monolithic form.

A molded article can be produced at a lowered cost by blow molding because in the blow molding use is made of only a mold capable of forming the outer surface of the molded article. However, there are problems such that not only can a soft synthetic resin only be used but also an article of large thickness cannot be molded as mentioned above.

SUMMARY OF THE INVENTION

The object of the present invention is to provide a method resolving the above problems of the prior art by which even an article having an undercut part formed on the inner or outer surface thereof can efficiently be injection-molded in monolithic form and also to provide an apparatus for use in such a method.

Especially, the object of the present invention is to provide a molding method enabling simple molding of an article such as a pot or a screw whose molding has heretofore been unfeasible and also to provide an apparatus for use in such a method.

The aspects of the present invention attaining the above objects will be set forth below.

A) In the first aspect of the present invention, there is provided a method of molding a synthetic resin with the use of an apparatus comprising an outer mold S and an inner mold N arranged so as to form a cavity C inside the outer mold S, the inner mold N comprising a central mold segment having a part whose size is reduced toward its head and mold segments for forming an inner surface of a molded article which are supported so as to be able to meet and get apart from each other around the central mold segment and divided into a plurality of separate segments, wherein the mold segments for forming the inner surface of the molded article are rendered movable toward the center of the apparatus by moving the central mold segment and wherein the inner mold N is withdrawn in the form of its size reduced as a whole from inside the molded article supported in the outer mold S.

B) In the second aspect of the present invention, there is provided an apparatus for molding a synthetic resin which comprises an outer mold S and an inner mold N arranged so as to form a cavity C inside the outer mold S, the inner mold N comprising a central mold segment 4 having a part whose size is reduced toward its head and mold segments 6, 7 for forming an inner surface of a molded article which are supported so as to be able to meet and get apart from each other around the central mold segment 4 and divided into a plurality of separate segments, wherein the mold segments 6, 7 are rendered movable toward the center of the apparatus by moving the central mold segment 4 from a molding position and wherein outer mold segments 16, 16 are supported by a top plate 15 in a manner such that the inner mold N is withdrawn from inside the molded article supported in the outer mold segments 16, 16 in the condition that the size of the mold segments 6, 7 is reduced as a whole.

C) In the third aspect of the present invention, there is provided the above synthetic resin molding apparatus according to the second aspect, wherein the central mold segment 4 is in pyramidal form and has a plurality of inclined surfaces so formed that the size of each of the surfaces is reduced toward its tip, along which the mold segments 6, 7 are guided toward the center of the apparatus.

D) In the fourth aspect of the present invention, there is provided the above synthetic resin molding apparatus according to the second aspect, wherein the central mold segment 4 is in conical form and has a plurality of curved inclined surfaces so formed that the size of each of the surfaces is reduced toward its tip, along which the mold segments 6, 7 are guided toward the center of the apparatus.

E) In the fifth aspect of the present invention, there is provided the above synthetic resin molding method according to the first aspect, wherein the cavity C formed between the outer mold S and the inner mold N is in potlike form.

F) In the sixth aspect of the present invention, there is provided the above synthetic resin molding method according to the first aspect, wherein the cavity C formed between the outer mold S and the inner mold N is in the form of a screw.

In the present invention, the inner mold N is divided into a plurality of mold segments 6, 7 which are so constructed as to meet and get apart from each other around the central mold segment 4. The outer mold S is arranged so as to surround the outer surfaces of the mold segments 4, 6, 7 when these meet, so that, upon recession of the mold segment 4, the mold segments 6, 7 accordingly meet around the mold segment 4 to thereby form a space between the outer mold S and the inner mold N. Therefore, even a molded article having an undercut part which is a part where there occurs the condition of disenabling move of the mold, i.e., where a part of the mold is caught when the mold is opened in the direction of the move thereof can be readily obtained.

The present invention can provide a method of producing a synthetic resin molding having an undercut part formed at some portion of the molding such as, especially, a pot or large screw made of a synthetic resin. Also, the present invention provides an apparatus suitable for use in the above method.

DESCRIPTION OF THE PREFERRED EMBODIMENTS

Embodiments of the present invention will now be described with reference to the drawings.

Figure 1:
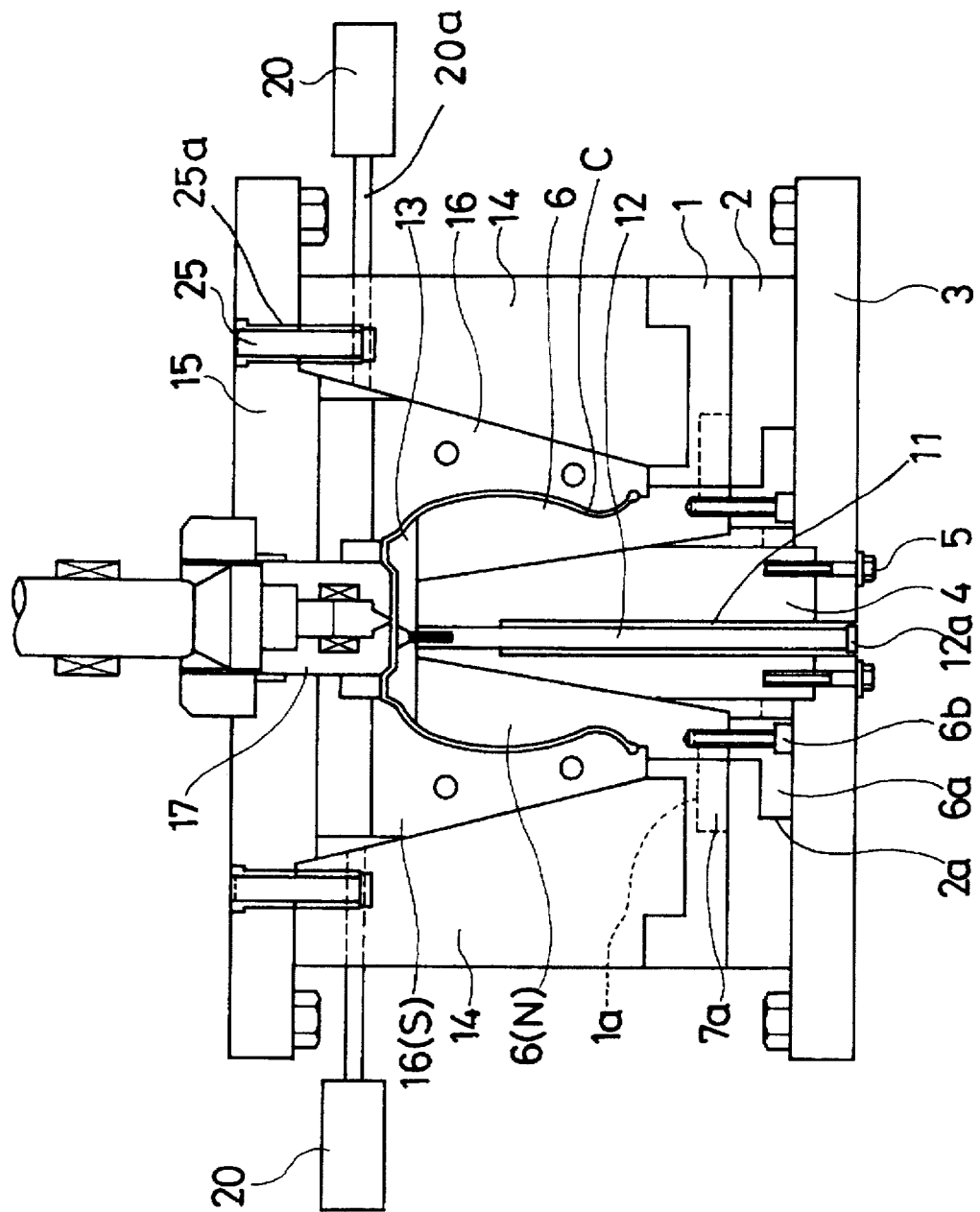
FIG. 1 is a side sectional view showing essential part of a molding apparatus.

Referring to FIG. 1, three bottom plates consisting of an upper bottom plate 1, a middle bottom plate 2 and a lower bottom plate 3 are disposed as a base plate. A pyramidal central mold segment 4 is secured by a bolt 5 to a central part of the lower bottom plate 3.

Four side mold segments 6 are arranged by the middle bottom plate 2 in a fashion such that they are slid so as to enable approach to the four pyramidal faces of the central mold segment 4 and getting apart therefrom. Further, four corner mold segments 7 are supported by the upper bottom plate 1 in a fashion such that they are slid so as to enable approach to the corners of the central mold segment 4 and getting apart therefrom.

Figure 4:
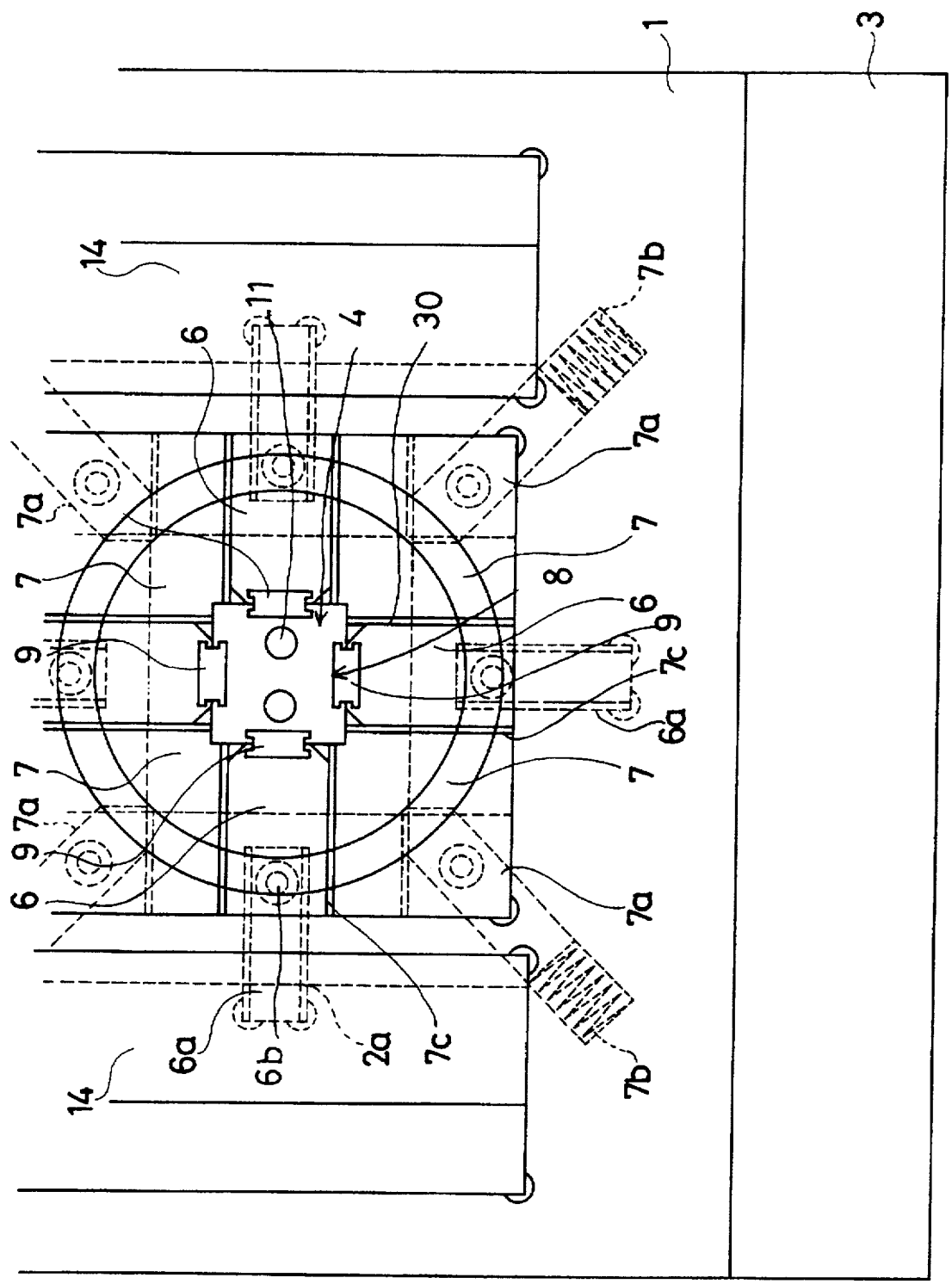
FIG. 4 is a plan showing the structure of an inner mold.
Figure 5:
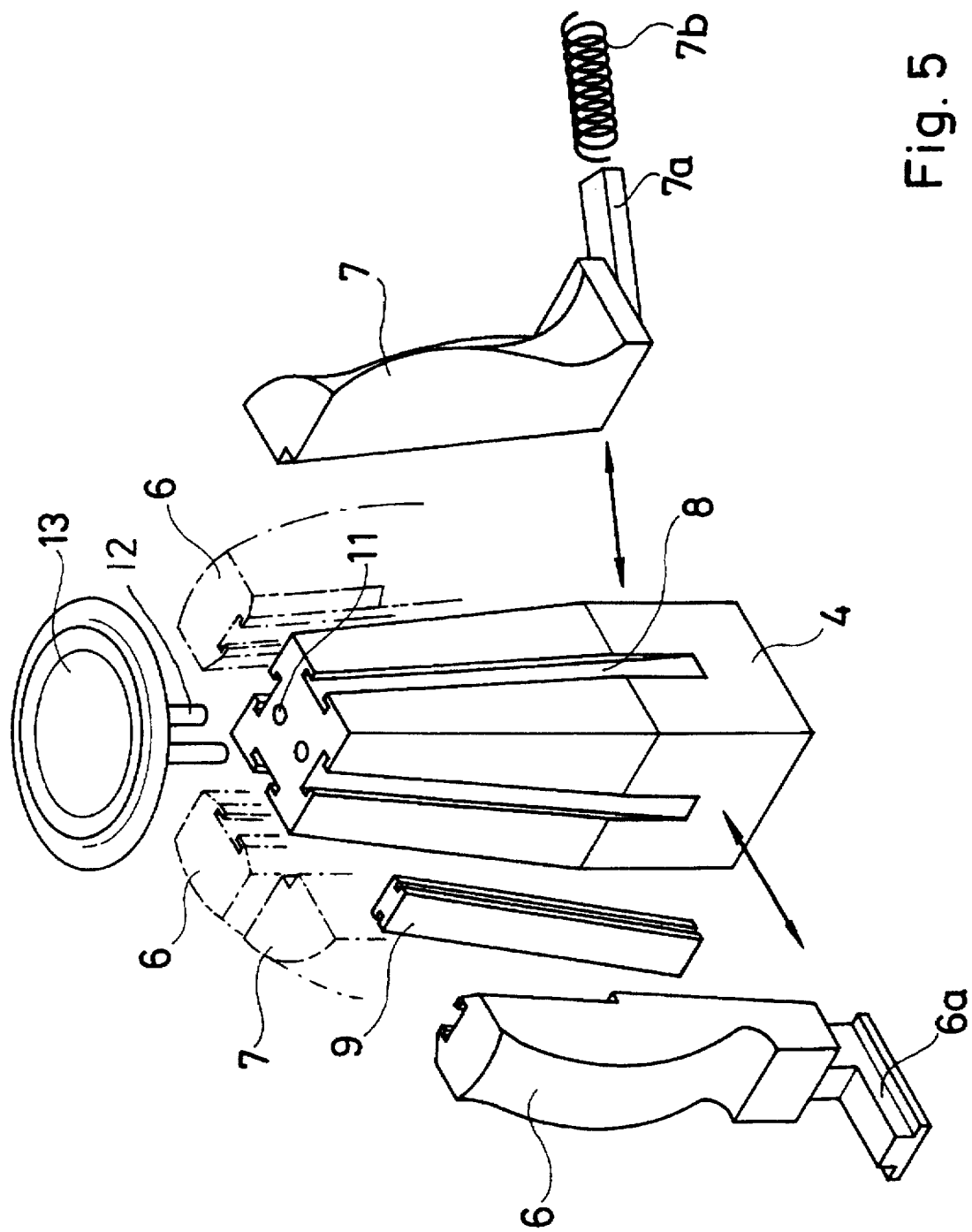
FIG. 5 is a perspective view showing a central mold segment and mold segments composing the inner mold in an exploded form.

Referring to FIGS. 4 and 5, the central mold segment 4 has its lower part shaped like a square pole and has its upper part shaped like a guadrangular pyramid whose size is reduced as the height increases. The four side faces of the central mold segment 4 have respective engagement channels 8 formed therein as shown in FIG. 5. Each of the above engagement channels 8 engages one side of a rail member 9 (member having two sides provided with respective channels) in a manner such that the rail member 9 is slidable along the engagement channel 8. The side mold segment 6 slidably engages the other side of the rail member 9.

A thin plate 30 for bearing is disposed between the corner mold segment 7 and the side mold segment 6 as shown in FIG. 4 for the purpose of improving the slides thereof. Although this thin plate 30 may be secured to whichever mold segment, it is preferred that it be pasted to a side of the corner mold segment 7.

When the central mold segment 4, the rail members 9, the side mold segments 6 engaging the respective rail members 9 and the corner mold segments 7 get together, their engagement relationship is as illustrated in FIG. 4. They are so arranged that causing the lower bottom plate 3 to get apart from the upper bottom plate 1 and the middle bottom plate 2 lowers the central mold segment 4 with respect to the side mold segments 6 and the corner mold segments 7, thereby forming a cavity surrounded by outer mold segments 16.

Each side mold segment 6 has its lower part secured to a guide piece 6a by a bolt 6b. This guide piece 6a is so arranged to move along a guide channel 2a formed on the lower side of the middle bottom plate 2 (see FIGS. 4 to 6). The side mold segment 6 is so structured as to move along the inclined face of the central mold segment 4 through the medium of the rail member 9 and the engagement channel 8, so that, referring to FIG. 1, downward moving the central mold segment 4 together with the lower bottom plate 3 causes the side mold segment 6 to be pulled toward the center through the medium of the rail member 9, thereby achieving desired movement.

Figure 6:
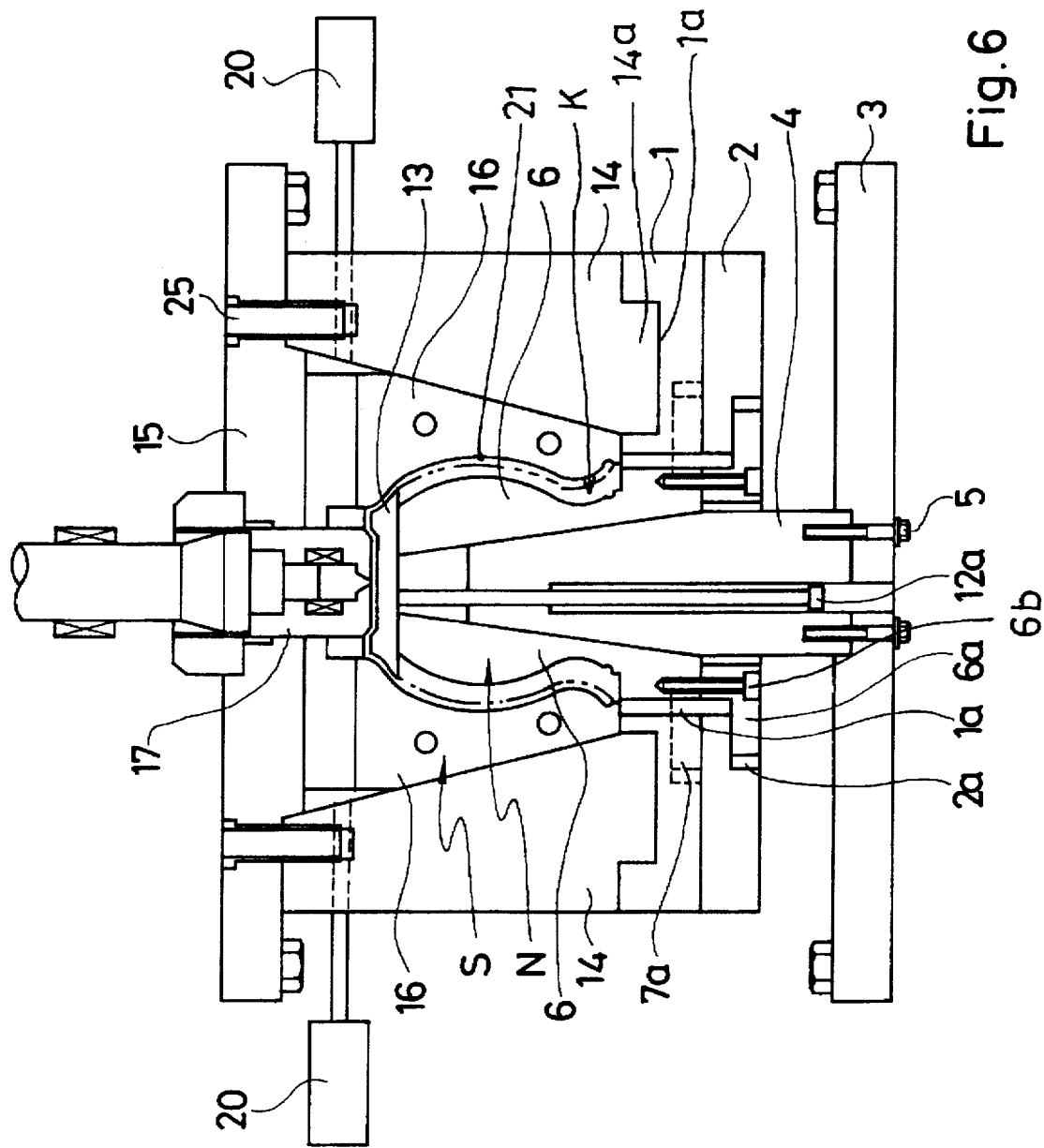
FIG. 6 is a sectional view showing the conditions of release of the inner mold from the molded article.

Also, each corner mold segment 7 has its lower part provided with a guide piece 7a (see FIGS. 4 to 6). This guide piece 7a is fitted in a guide channel 1a formed on the lower side of the upper bottom plate 1. A rear end thereof is provided with a coil spring 7b to apply its elastic force. Thus, the corner mold segment 7 is so arranged as to automatically advance toward the center simultaneously with the move of the side mold segment 6 caused by the recession of the central mold segment 4.

The central mold segment 4 is provided with two vertical holes 11 passing through the same in the longitudinal direction thereof. Guide bars 12 are inserted in the vertical holes 11, and a cover plate 13 is secured to upper ends of the guide bars 12. This cover plate 13 is a member which, when the central mold segment 4 and the side mold segments 6 and corner mold segments 7 disposed therearound meet, contacts their tops and eliminates the parting lines of these mold segments. The guide bars 12 supporting the cover plate 13 have their lower ends provided with extended parts 12a. The extended parts 12a are accommodated in the vertical holes 11 so that, even when the central mold segment 4 is extensively moved downward, the cover plate 13 is positioned at the top of an assembly of the mold segments.

Figure 7:
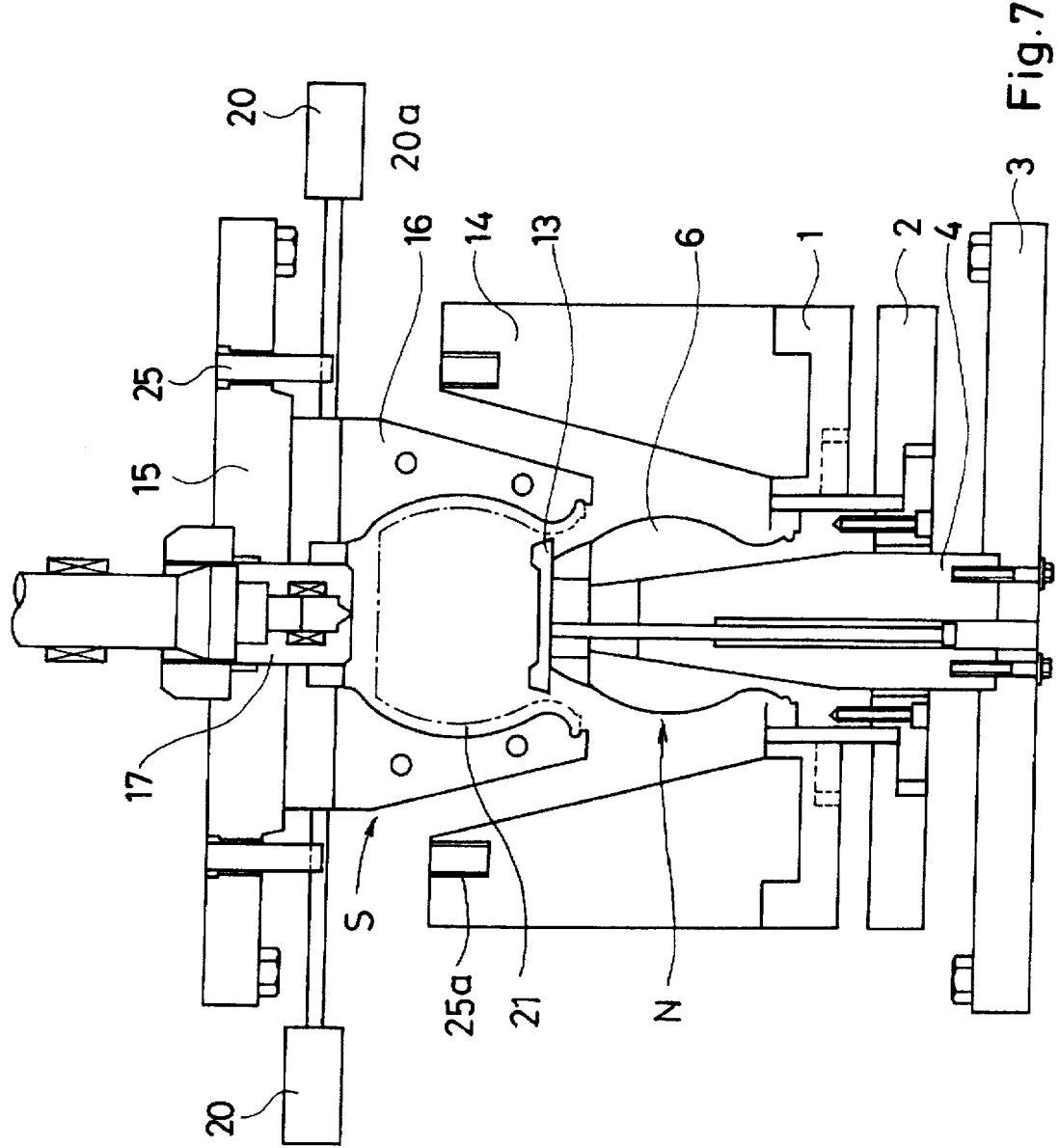
FIG. 7 is a sectional view showing the conditions of the inner mold having been withdrawn from inside the molded article.

Fitting recesses 1a are formed on two sides of the top of the upper bottom plate 1. Open-topped side press plates 14 with respective inclined surfaces have respective fitting protrusions 14a disposed at their lower parts, which are fitted in the above recesses 1a to thereby immobilize the side press plates 14 (FIGS. 1 and 7).

A guide pipe 25a in which a pin 25 secured to a top plate 15 is inserted is implanted in an upper end of each side press plate 14. The side press plate 14 is secured to the top plate 15 while the mold segments are meeting.

Figure 2:
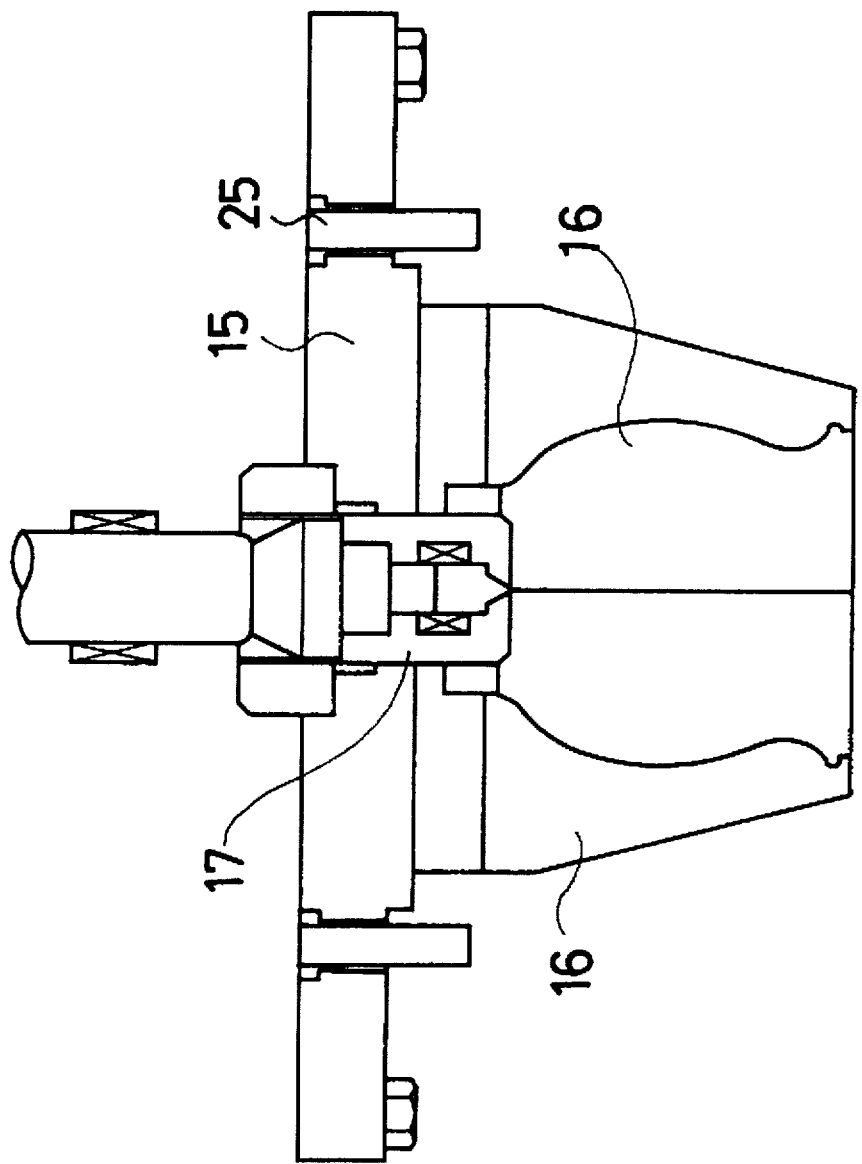
FIG. 2 is a side sectional view showing an outer mold supported by a top plate.
Figure 3:
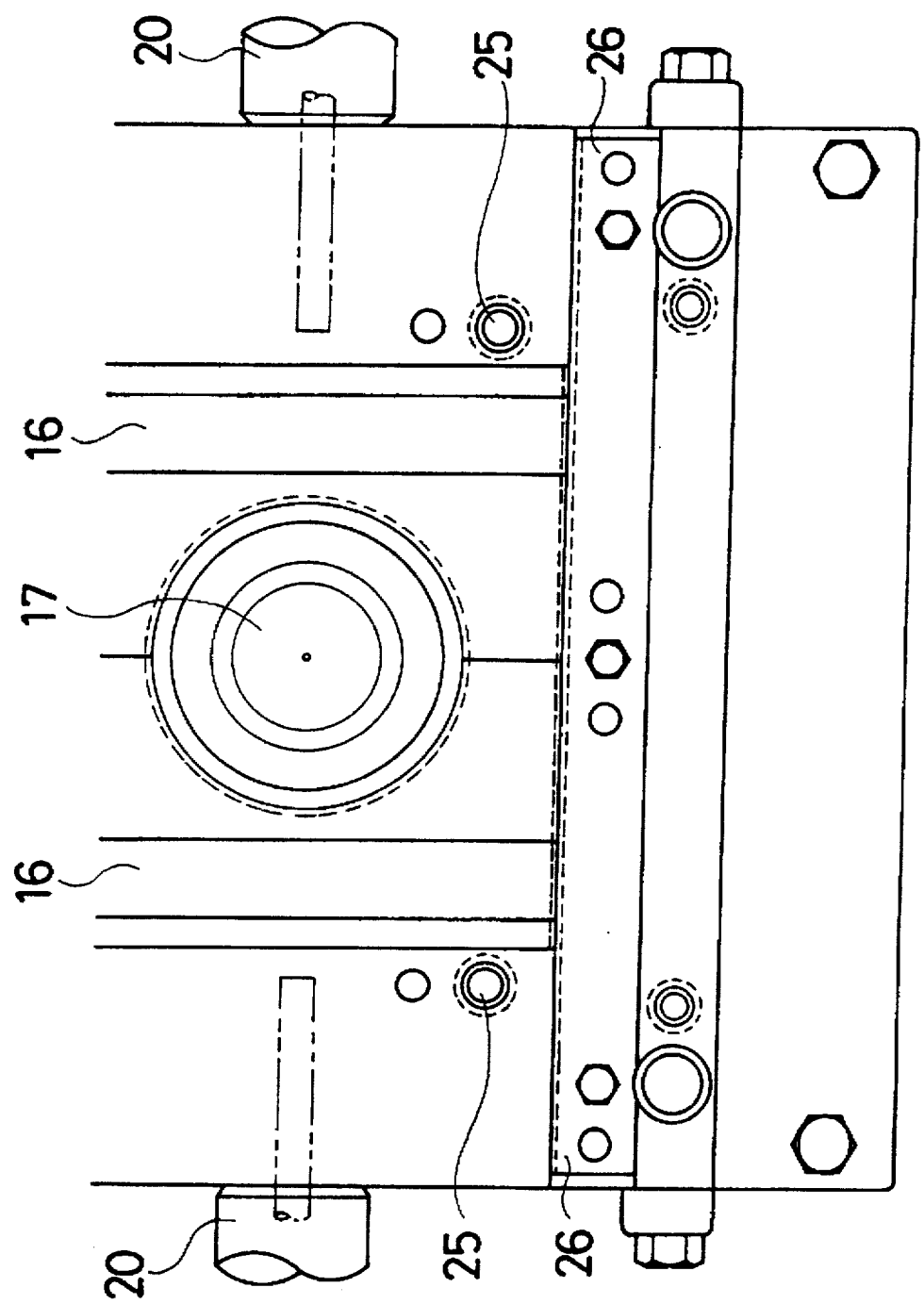
FIG. 3 is a front view showing the profile of the outer mold of FIG. 2 viewed from its lower side.
Figure 8:
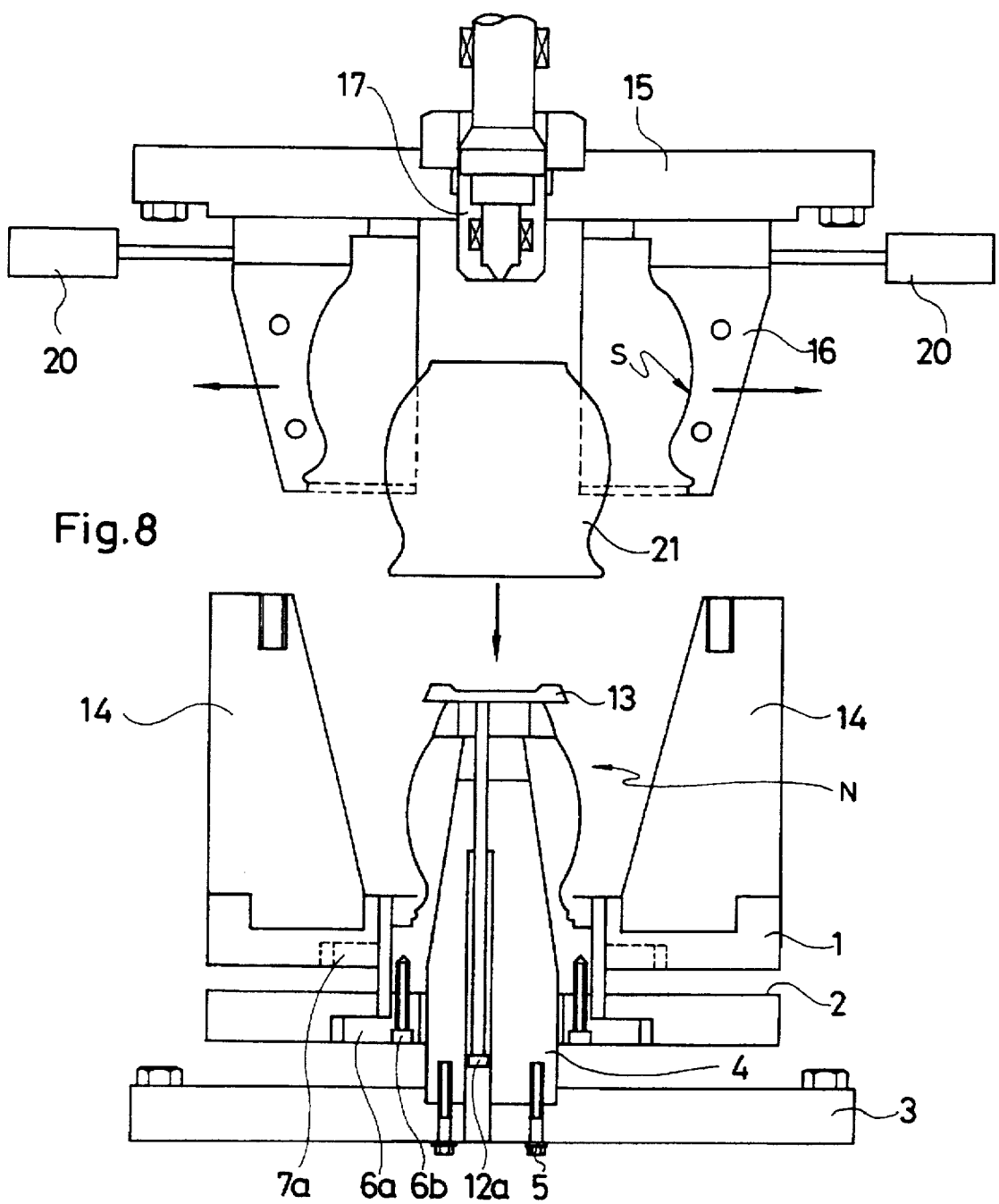
FIG. 8 is a sectional view showing the conditions of takeoff of the molded article having been supported by the outer mold.

Referring to FIG. 2, the lower side of the top plate 15 supports a two-segment outer mold 16 (outer mold S). This outer mold 16 is supported by the top plate 15 with an upperside guide part of the former fitted in the latter while permitting lateral move, specifically, the move that the outer mold segments 16 approach to each other or get apart from each other, as illustrated in FIGS. 7 and 8. The front edge of a piston rod 20a of a cylinder device 20 is secured to the outer mold 16. This cylinder device 20 is operated to thereby cause the outer mold segments 16 to meet at a given position. In this state, molding of a synthetic resin is conducted. Then, the outer mold segments are laterally moved outward to thereby enable takeoff of a molded article from the outer mold 16.

When the inner mold N (central mold segment 4, side mold segments 6 and corner mold segments 7) and the outer mold S (outer mold segments 16, 16) are meeting as shown in FIG. 1, the cavity C occurring therebetween is in potlike form in this embodiment.

When a melted resin is injected through a nozzle 17 disposed at the center of the top plate 15 into the cavity C, a pressure which would expand and open the cavity C occurs between the inner mold N and the outer mold S. The press force of the outer mold S is the sum of surface pressures at the inclined face formed on the back of the outer mold 16 and at the side press plate 14.

The pressure which would shrink the inner mold N composed of eight mold segments 6, 7 becomes the surface pressures occurring at the pyramidal faces of the central mold segment 4 and is borne.

The molding method according to the present invention will be described below.

First step:. The inner mold N is formed by assembling the upper bottom plate 1, the middle bottom plate 2 and the lower bottom plate 3 as illustrated in FIG. 1. In this state, the outer mold segments 16 are caused to be in open form by means of the cylinder device 20.

The outer mold S is caused to approach to around the inner mold N by operating the cylinder device 20 while elevating the inner mold N together with the bottom plates 1, 2 and 3. Further, when the side press plates 14 are elevated together with the bottom plates 1, 2 and 3, the side press plates 14 press the inclined faces of the outer mold segments 16 of the outer mold S with the result that the outer mold S is positioned around the inner mold N at a given space, i.e., a space forming the cavity C, with the pins 25 provided on the side of the top plate 15 being fitted in the guide tubes 25a disposed on the tops of the side press plates 14. Thus, the set-up for injection molding is completed.

Second step: A molten resin fed from an injection machine not shown is injected through the nozzle 17 into the cavity C and held for a given period of time, thereby solidifying a molding in the cavity C.

Third step: Referring to FIG. 6, lowering the lower bottom plate 1 and the central mold segment 4 supported thereby with respect to the other mold segments 6, 7 and 13 leads to formation of clearance K among the central mold segment 4, the side mold segments 6 and the corner mold segments 7.

However, the central mold segment 4 and each side mold segment 6 are connected to each other through the rail member 9. Consequently, downward move of the central mold segment 4 is accompanied by move of the side mold segment 6 toward the inclined face of the central mold segment 4.

Moreover, the elastic force of the coil spring 7b urging move toward the center is applied to each corner mold segment 7. Therefore, the move of the central mold segment 4 leads to simultaneous gathering of the mold segments 6, 7 around the central mold segment 4. As a result, as shown in FIG. 6, a clearance is formed between the inner surface of the potlike molded article 21 supported inside the outer mold segments 16 and the inner mold N. The formation of this clearance is a requisite for enabling downward withdrawal of the inner mold N from inside the molded article 21.

Fourth step: Referring to FIG. 7, lowering the bottom plates 1, 2 and 3 at given time intervals is also a requisite for enabling downward withdrawal of the inner mold N from inside the molded article 21 supported in the outer mold S.

In this step, moving the lower bottom plate 3 to thereby effect maximum lowering of the central mold segment 4 and subsequently moving the middle bottom plate 2 to thereby lower the side mold segments 6 cause the corner mold segments 7 to move toward around the central mold segment 4. Thus, the contour of the inner mold N can be fully reduced.

Fifth step: Referring to FIG. 8, the upper bottom plate 1, middle bottom plate 2 and lower bottom plate 3 are fully moved downward to thereby fully lower the inner mold N from the outer mold S supported by the top plate 15, and the outer mold segments 16 supported by the top plate 15 are moved so as to open as indicated by the arrows by operating the cylinder device 20.

When this condition is attained, both the outer mold segments 16 are fully opened, so that the potlike molded article 21 having been supported thereby is removed naturally or by push by means of a pusher from the outer mold segments 16. Thus, the molded article 21 can be withdrawn.

For the convenience of description, the respective movements of the mold segments 4, 6, 7 and 13 constituting the inner mold N and the mold segments 16 constituting the outer mold S have been illustrated above to facilitate understanding. However, the procedure including the closing of the mold, the injection of a molten resin into the mold cavity, the size reduction and move of the inner mold N, the extension and opening of the outer mold S and the withdrawal of the molded article can be conducted in the same manner as in the conventional injection molding.

Therefore, in the practical process, the side mold segments 6 and corner mold segments 7 constituting the inner mold N are moved at once or at time intervals in accordance with the downward move of the central mold segment 4 to thereby form a clearance large enough to enable withdrawal of the molded article without injuring it between the inner mold N and the outer mold S.

Although the present invention has been developed to obtain mainly a molded article having special contour such as a pot, this is not limitative and the present invention can be applied to the production of molded articles such as those having internal irregular shape, e.g., a nut and cases having inner faces provided with protrusions or engaging parts.

Figure 9:
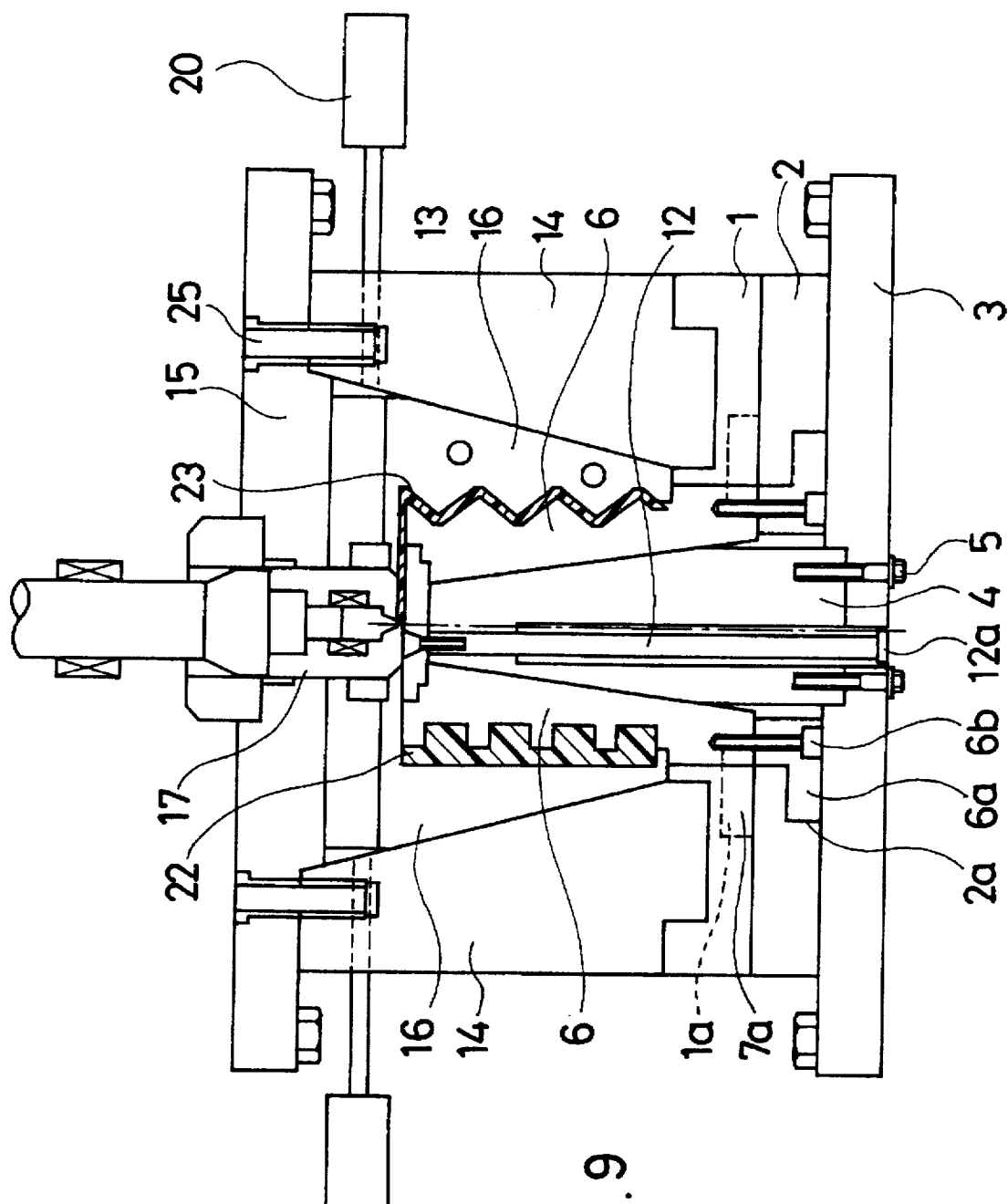
FIG. 9 is a sectional view showing an example of mold for use in producing a molded article with another structure.

FIG. 9 shows forms of molds for use in molding a nut 22 (shown in the left half of the figure) and a bellows screw 23 (shown in the right half of the figure). Structuring the outer mold S and the inner mold N as shown there enables ready production of any articles having respective large undercut parts.

The present invention provides an apparatus for molding a synthetic resin which comprises an outer mold S and an inner mold N arranged so as to form a cavity C inside the outer mold S, the inner mold N comprising a central mold segment 4 having a part whose size is reduced toward its head and mold segments 6, 7 for forming an inner surface of a molded article 21 which are supported so as to be able to meet and get apart from each other around the central mold segment 4 and divided into a plurality of separate segments, wherein the mold segments 6, 7 are rendered movable toward the center of the apparatus by moving the central mold segment 4 and wherein the inner mold N is withdrawn from inside the molded article 21 supported in the outer mold S in the condition that the size of the inner mold N is reduced as a whole. Also, the present invention provides a molding method comprising the use of the above apparatus. The present invention enables exertion of the following effects.

That is, the inner mold N is so structured as to cause the mold segments 6, 7 adapted to form the inner surface of the molded article 21 to meet around the central mold segment 4 and can have a size reduction and a given shape in accordance with the move of the central mold segment 4. Therefore, even the molded article 21 having undercut part can be readily produced by employing appropriate shapes and combination with respect to the above mold segments.

What is claimed is:

1. A method of molding a synthetic resin with the use of an apparatus comprising an outer mold (S) and an inner mold (N) arranged so as to form a cavity (C) inside the outer mold (S); said inner mold (N) comprising a central mold segment (4) having a part whose size is reduced toward its head and mold segments (6, 7) supported in a manner capable of being brought altogether around said central mold segment (4) to a size-reduced condition, and a cover plate (13) disposed to cover head ends of said central mold segment (4) and said mold segments (6, 7) in said size-reduced condition, the cover plate (13) together with said mold segments (6, 7) forming the inner surface of an article to be molded; said mold segments (6, 7) comprising side mold segments (6) and corner mold segments (7) each arranged between each adjacent side mold segments (6); said side mold segments (6) being slidably mounted on rail members (9) which are in turn slidably engaged in engagement channels (8) formed in side walls of said central mold segment (4); said corner mold segments (7) being applied with elastic force in directions toward the center of the apparatus:

the method including the steps of moving said central mold segments (4) to cause mold segments (6, 7) to be movable toward the center of the apparatus, and in a condition of said inner mold (N) of being reduced in its overall size, withdrawing the inner mold (N) out of a molded article supported in position by said outer mold (S).

2. The synthetic resin molding method according to claim 1, wherein the cavity (C) formed between the outer mold (S) and the inner mold (N) is in potlike form.

3. An apparatus for molding a synthetic resin which comprises an outer mold (S) and an inner mold (N) arranged so as to form a cavity (C) inside the outer mold (S); said inner mold (N) comprising a central mold segment (4) having a part whose size is reduced toward its head and mold segments (6, 7) supported in a manner capable of being brought altogether around said central mold segment (4) to a size-reduced condition, and a cover plate (13) disposed to cover head ends of said central mold segment (4) and said mold segments (6, 7) in said size-reduced condition, the cover plate (13) together with said mold segments (6, 7) forming the inner surface of an article to be molded; said mold segments (6, 7) comprising side mold segments (6) and corner mold segments (7) each arranged between each adjacent side mold segments (6); said side mold segments (6) being slidably mounted on rail members (9) which are in turn slidably engaged in engagement channels (8) formed in side walls of said central mold segment (4); said corner mold segments (7) being applied with elastic force in directions toward the center of the apparatus; said outer mold (S) comprising outer mold segments (16, 16) supported by a top plate (15) in a manner such that said inner mold segment (4) can be moved from a molding position to cause said mold segments (6, 7) to be movable toward the center of the apparatus and, in a condition of said mold segments (6, 7) of being reduced in its overall size, said inner mold (N) can be withdrawn out of a molded article supported by said outer mold segments (16, 16).

4. The synthetic resin molding apparatus according to claim 3, wherein the central mold segment (4) is in a pyramidal form and has a plurality of inclined surfaces so formed that the size of each of the surfaces is reduced toward its tip, along which the mold segments (6, 7) are guided toward the center of the apparatus.

5. The synthetic resin molding apparatus according to claim 3, wherein the central mold segment (4) is in conical form and has a plurality of curved inclined surfaces so formed that the size of each of the surfaces is reduced toward its tip, along which the mold segments (6, 7) are guided toward the center of the apparatus.

* * * * *